(12) United States Patent
Chen

(10) Patent No.: US 7,963,043 B2
(45) Date of Patent: Jun. 21, 2011

(54) SUPPORT SHOE FOR A RECIPROCATING SAW

(75) Inventor: Yasheng Chen, Nanjing (CN)

(73) Assignee: Chervon Limited, Kwai Chung (HK)

( * ) Notice: Subject to any disclaimer, the term of this patent is extended or adjusted under 35 U.S.C. 154(b) by 139 days.

(21) Appl. No.: 11/974,782

(22) Filed: Oct. 16, 2007

(65) Prior Publication Data

US 2009/0113727 A1 May 7, 2009

(30) Foreign Application Priority Data

Oct. 16, 2006 (CN) ...................... 2006 2 0126405 U

(51) Int. Cl.
*B27B 11/04* (2006.01)
(52) U.S. Cl. ................. 30/377; 30/374; 30/392
(58) Field of Classification Search ............ 30/370–377, 30/392–394, 340; 403/323, 324; 83/699.21
See application file for complete search history.

(56) References Cited

U.S. PATENT DOCUMENTS

| 5,007,172 A | 4/1991 | Palm |
| 5,421,091 A | 6/1995 | Gerritsen, Jr. |
| 6,272,757 B1 * | 8/2001 | Roe ................................. 30/377 |
| 7,437,824 B2 * | 10/2008 | Chreene et al. .................. 30/377 |
| 2005/0183271 A1 * | 8/2005 | Sugiura et al. .................. 30/392 |
| 2006/0090348 A1 | 5/2006 | Jiao |

* cited by examiner

*Primary Examiner* — Phong H Nguyen
(74) *Attorney, Agent, or Firm* — McDermott Will & Emery LLP

(57) ABSTRACT

A reciprocating saw includes a housing and a support shoe mounted on the front end of the housing which is adjacent to a saw blade. The support shoe includes a guide plate which is partly mounted in the housing and is movable thereabout, and a base plate pivotally connected to the guide plate. The guide plate has a series of recesses or apertures. The reciprocating saw also includes a locking member which is movable in the housing along a first direction and at least a portion of which could be engaged with any one of the recesses or apertures, and an adjusting member which is movable along a direction perpendicular to the first direction from a first position to a second position. The locking member is disposed between the adjusting member and the guide plate.

12 Claims, 3 Drawing Sheets

B-B

SUPPORT SHOE FOR A RECIPROCATING SAW

CROSS-REFERENCE TO RELATED APPLICATION

This application claims priority under 35 U.S.C. §119 of Chinese Application No. 200620126405.0, filed Oct. 16, 2006, which is hereby incorporated by reference.

FEDERALLY SPONSORED RESEARCH OR DEVELOPMENT

Not Applicable.

FIELD OF THE INVENTION

The present invention relates to a reciprocating saw, and more particularly, to an adjusting and locking device for a support shoe of a reciprocating saw.

BACKGROUND OF THE INVENTION

A reciprocating saw typically has a support shoe that permits the operator to position the saw relative to a workpiece. To facilitate operation of the saw and to position the blade of the saw accurately, the support shoe should be adjustable and lockable under different cutting conditions.

Many different locking units for support shoe of reciprocating saws have been disclosed in the art. For example, U.S. Pat. No. 5,007,172 discloses a locking structure using a cam. To fixedly lock the support shoe, a relatively large force is needed to be exerted on the cam.

U.S. Pat. No. 5,421,091 discloses a locking unit using a tapered pin to lock the support shoe. However, because the support shoe is locked by the pin under biasing of a spring, the support shoe is not steady enough in the biasing direction.

Another locking mechanism for a support shoe is disclosed in U.S. Patent Publication No. 20060090348A1. The support shoe is locked by a pin which includes two slots with different respective depths. With such a structure, when mounted the support shoe is not stable enough during operation. Further, the locking mechanism is very complex. Also, it is very inconvenient that operation of adjusting and locking must be processed from underside of the housing.

Accordingly, there is a need in the art for a simple adjusting and locking mechanism for a support shoe of a reciprocating saw that is stable during operation yet easy to access and adjust.

SUMMARY OF THE INVENTION

An object of the present invention is to provide an improved adjusting and locking mechanism for a support shoe of a reciprocating saw, such that the support shoe could be locked steadily via simple structure.

To achieve the object, a reciprocating saw of the present invention includes a housing, a driving unit disposed in the housing, a transmission system coupled to the driving unit, a blade connected to a reciprocating output shaft of the transmission system, and a support shoe mounted at a front end of the housing which is adjacent to the blade.

In one aspect of the present invention, the support shoe includes a guide plate which is at least partly mounted in the housing and is movable thereabout, and a base plate pivotally connected to the guide plate. The guide plate includes a series of detents. The reciprocating saw includes a locking member which is movable in the housing along a first direction, and an adjusting member which is movable along a second direction (perpendicular to the first direction) between a first operating position and a second operating position. The locking member is disposed between the adjusting member and the guide plate. First and second protrusions (or in an alternative embodiment recesses) with different heights are formed on the adjusting member along the second direction. When the adjusting member is in the first operating position, the first part of the adjusting member is engaged with the locking member and the locking member disengages from the detents on the guide plate. When the adjusting member is in the second operating position, the second part of the adjusting member is engaged with the locking member and the locking member is at least partly engages one of the detents.

With the structure as indicated above, the support shoe can be easily adjusted and also firmly locked in a desired position for a relative accurate cutting and operation of the saw.

BRIEF DESCRIPTION OF THE DRAWINGS

The present invention will be described further with details, basing on the combination of the preferred embodiment of the invention and the accompanying drawings, wherein.

DETAILED DESCRIPTION OF THE PREFERRED EMBODIMENT

Figure 1:
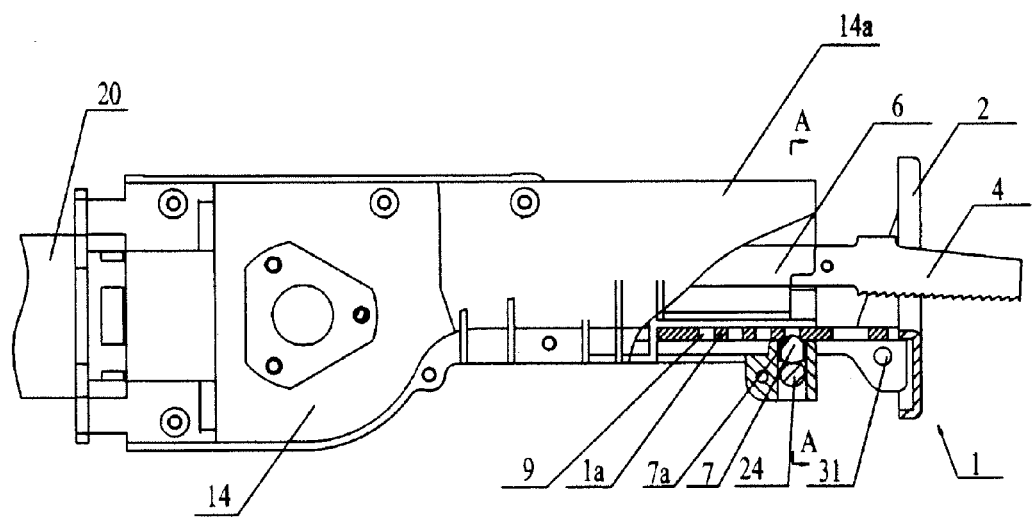
FIG. 1 is a side view of a front portion of a reciprocating saw, wherein a part of which is broken away to show a locking member of the support shoe which is in a locked position.

With reference to FIG. 1, a reciprocating saw includes a housing 14 comprised of two shells, a driving unit 20, i.e. motor or other suitable driving unit, contained within the housing 14, a transmission system (not shown) connected to the driving unit, and a blade 4 connected to the driving unit 20 via an output end of the transmission system. The housing 14 has an open end 14a from which the blade 4 extends outwardly from. A support shoe 1 is mounted on a front portion of the housing 14 adjacent to the open end 14a. The support shoe 1 includes a guide plate 1a and a base plate 2 which is supported on a workpiece during cutting. The base plate 2 is pivotally connected to the guide plate 1a. The transmission system includes an output shaft 6 which is connected to the blade 4 to drive the same. The reciprocating saw also includes a locking unit for fastening or loosening the guide plate 1a relative to the housing 14 thereby allowing adjustment of the support shoe 1.

A preferred embodiment of the present invention will be described hereinafter in detail, accompanied with illustration of FIGS. 1 to 6. Referring to FIG. 1, the guide plate 1a is movably received in a first guide slot 21 formed in the housing 14. A series of detent apertures 9 is formed in the guide plate 1a. A pivot 31 pivotally connects the guide plate 1a and the base plate 2. A second guide slot 22 is formed in the housing perpendicular to the guide plate 1a and is connected to the first guide slot 21. A locking member 7 is disposed in the second guide slot 22 and is movable therealong. Preferably, the locking member 7 has a tapered end portion 7a. A third guide slot 23 is formed in the housing 14 perpendicular to the second slot 22 and is connected thereto.

Figure 2:
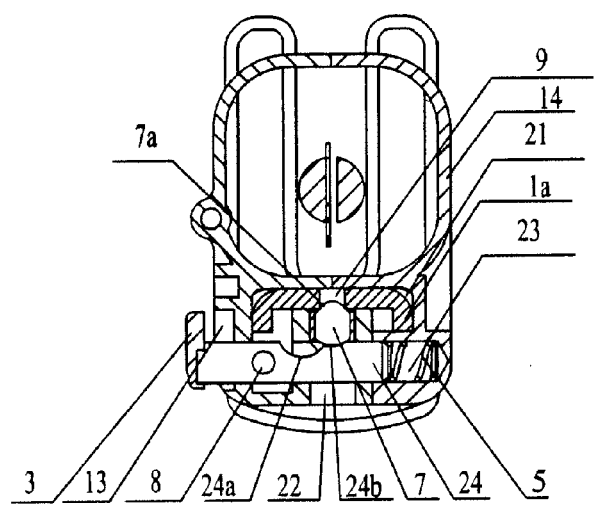
FIG. 2 is a sectional view of the reciprocating saw in FIG. 1 along A-A line.
Figure 5:
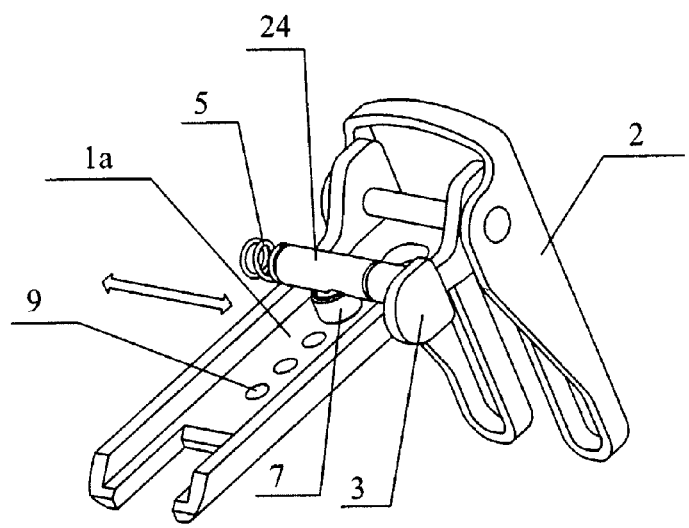
FIG. 5 is a perspective view of the support shoe and locking unit.
Figure 6:
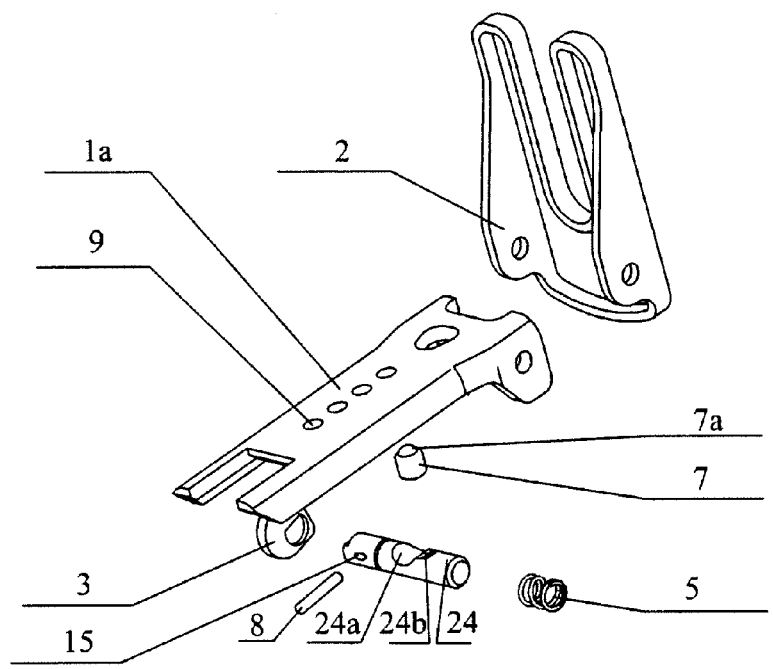
FIG. 6 is an exploded view of the support shoe and locking unit.

Referring to FIG. 2, FIG. 5 and FIG. 6, an adjusting pin 24 is disposed in the third guide slot 23. A compression spring 5 is biased between one end of the adjusting pin 24 and the housing 14, and a button 3 is mounted at the other end of the pin 24. A recess 13 for receiving the button 3 is formed in the housing 14. The adjusting pin 24 has an aperture 15, through which a stop pin 8 is inserted to limit the movement of the adjusting pin 24 in a predetermined range and also for preventing rotation of the adjusting pin 24 in the third guide slot 23. Further, a first recess 24a and a second recess 24b with different depth are formed on the adjusting pin 24.

Figure 3:
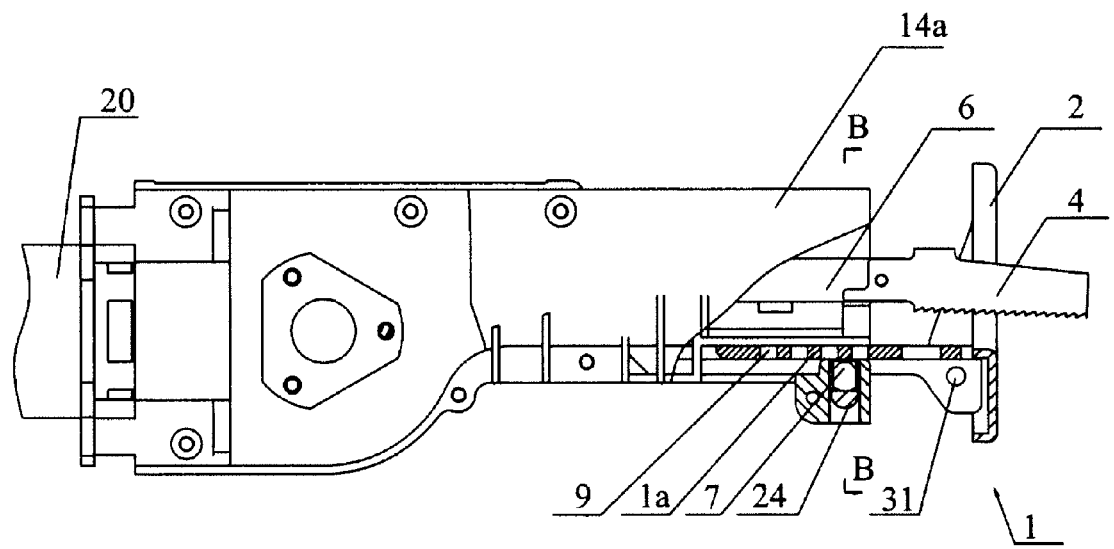
FIG. 3 is a side view of a front portion of a reciprocating saw, wherein the support shoe is in a released position.
Figure 4:
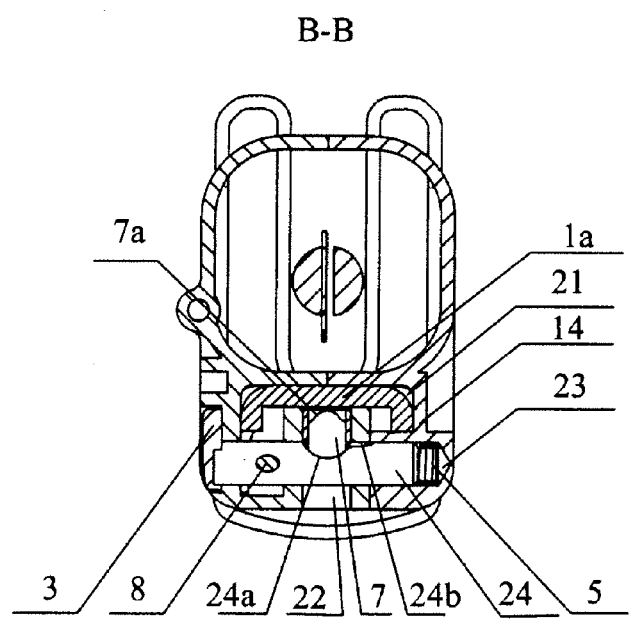
FIG. 4 is a sectional view of the reciprocating saw in FIG. 3 along B-B line.

Referring to FIG. 3 and FIG. 4, when the position of the support shoe 1 needs to be adjusted, an operator of the saw presses the button 3 to move the adjusting pin 24 against biasing of the spring 5. When the first recess 24a which has a greater depth (than second recess 24b) is moved to beneath the locking member 7, the locking member 7 disengages from the detent apertures 9 of the guide plate 1a as a result of gravity and sits into the first recess 24a (see FIG. 4). As a result, the position of the support shoe 1 relative to the housing 14 could be adjusted by moving the guide plate 1a within first guide slot 21.

Referring to FIG. 1 and FIG. 2, when the support shoe 1 is moved to the required position, the operator of the saw releases button 3 and the adjusting pin 24 will move along the third guide slot 23 under biasing of the spring 5. When the second recess 4b which has less depth (than the first recess 24a) is moved to beneath the locking member 7, the locking member 7 is forced to move upwardly and the tapered end portion 7a of the locking member 7 engages one of the detent apertures 9 of the guide plate 1a, such that the guide plate 1a is tightly fixed is the desired position.

In other embodiments, the first recess 24a and the second recess 24b as mentioned above could be a first protrusion and a second protrusion with different heights instead.

The present invention is not restricted as the embodiments disclosed hereinabove. Any substitutes and modifications according to the spirit of the present invention will be regarded as falling within the appended claims of the present invention.

I claim:

1. A saw comprising:
a housing having one open end;
a driving unit positioned within the housing;
a blade connected to the driving unit and extending outwardly from the open end of the housing;
a support shoe mounted to the housing adjacent the open end of the housing;
the support shoe comprising a base plate pivotally connected to a guide plate, the guide plate having an adjustment assembly comprising an adjustment pin having a first recessed indentation and a second recessed indentation therein, wherein the first recessed indentation has a greater depth than the second recessed indentation, the adjustment assembly operatively connected to a locking member, the adjustment assembly further having a first operating position wherein the locking member engages one of a plurality of recesses in the guide plate to fix the support shoe in a given position and a second operating position wherein the locking member is disengaged from the guide plate and the support shoe is free to move relative to the housing; and,
wherein the housing has first, second and third guide slots, the guide plate movably positioned in the first guide slot, the locking member movably positioned in the second guide slot, and the adjustment assembly movably positioned in the third guide slot and the third guide slot is perpendicular to, and connected to, the second guide slot.

2. The saw of claim 1, wherein the adjustment pin includes a button at one end and a spring at another end.

3. The saw of claim 1, wherein the locking member is disposed between the adjustment assembly and the guide plate.

4. The saw of claim 1, wherein the locking member has at least one tapered end.

5. A reciprocating saw comprising:
a housing having a front end;
a blade fixed to the front end of the housing;
a support shoe mounted on the front end of the housing, the support shoe including:
a guide plate which is partly mounted in the housing and is movable thereabout;
a base plate pivotally connected to the guide plate, the guide plate having a series of detents defined therein;
a locking member which is movable along a first direction in the housing;
an adjusting member comprising an adjustment pin having a first recessed indentation and a second recessed indentation therein, wherein the first recessed indentation has a greater depth than the second recessed indentation, the adjustment member which is movable along a second direction in the housing, the second direction being perpendicular to the first direction;
wherein the locking member is connected to the adjusting member and the guide plate, and when the adjusting member is in a first operating position, the adjusting member is engaged with the locking member and the locking member is disengaged from the detents on the guide plate, and when the adjusting member is a second operating position, the adjusting member is engaged with the locking member and the locking member is at least partly engaged with one of the detents on the guide plate; and,
a first guide slot which at least partly receives the guide plate, a second guide slot which at least partly receives the locking member, and a third guide slot which at least partly receives the adjusting member, wherein the second guide slot is perpendicular to the guide plate and the third guide slot is perpendicular to the second guide slot.

6. The saw of either claim 5 or claim 1, wherein the adjustment pin is cylindrical in shape.

7. The saw of either claim 5 or claim 1, wherein the first recessed indentation and the second recessed indentation are formed in an outer surface of the adjustment pin.

8. The reciprocating saw of claim 5, wherein the locking member has a tapered end portion.

9. The reciprocating saw of claim 5, wherein the first direction is perpendicular to the guide plate.

10. The reciprocating saw of claim 5, wherein an elastic member is biased on the adjusting member.

11. The reciprocating saw of claim 10, wherein the elastic member is connected between one end of the adjusting member and the housing.

12. The reciprocating saw of claim 11, wherein the adjusting member has an operation button on another end thereof.

* * * * *